United States Patent
Popa (10) Patent No.: US 7,224,761 B2
(45) Date of Patent: May 29, 2007

(54) METHOD AND ALGORITHM FOR SEARCHING AND OPTIMIZING NUCLEAR REACTOR CORE LOADING PATTERNS

(75) Inventor: Frank D. Popa, Murrysville, PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 159 days.

(21) Appl. No.: 10/993,249

(22) Filed: Nov. 19, 2004

(65) Prior Publication Data

US 2006/0109944 A1    May 25, 2006

(51) Int. Cl.
   *G21C 19/00* (2006.01)
(52) U.S. Cl. ............... 376/267; 376/261; 434/218; 703/6
(58) Field of Classification Search ............... 376/267, 376/261, 260; 434/218; 703/6
See application file for complete search history.

(56) References Cited

U.S. PATENT DOCUMENTS

| | | | |
|---|---|---|---|
| 5,225,147 A | 7/1993 | Lin et al. | |
| 6,283,102 B1 | 9/2001 | Nelson et al. | |
| 6,748,348 B1* | 6/2004 | Russell, II | 703/6 |
| 6,862,329 B1* | 3/2005 | Kropaczek et al. | 376/267 |
| 6,931,090 B2* | 8/2005 | Chao et al. | 376/267 |
| 2005/0089831 A1* | 4/2005 | Russell et al. | 434/218 |

OTHER PUBLICATIONS

U.S. Appl. No. 10/374,691.
Shengyi Si, Integer Permutation Programming and the Loading Pattern Optimization Code SUPERLPOS Used at SNERDI, Physor 2002, Seoul, Korea, Oct. 7-10, 2002, pp. 1-13.
Y.A. Chao, "Coarse Mesh Finite Difference Methods and Applications", Sponsored by Physor, held Monday, May 8, 2000 thru Thursday, May 11, 2000, pp. 1-17.
Taex Kyum Kim, "Mixed Integer Programming for Pressurized Water Reactor Fuel-Loading-Pattern Optimization", Nuclear Science and Engineering: 127, pp. 346-357 (1997).

* cited by examiner

*Primary Examiner*—Ricardo J. Palabrica (57) ABSTRACT

A method is for establishing a nuclear reactor core loading pattern (LP) for fuel assemblies and burnable absorbers (BAs). The method establishes an optimum LP through the steps of: a) providing nuclear data representing fuel assemblies and BAs in a nuclear reactor core; b) depleting the nuclear data to form a reference core depletion; c) incorporating the nuclear data into a system of linear equations of a nuclear design quality flux solution method; d) defining the system of linear equations to include constraints which accurately represent the neutron physics of the reactor; employing the equations as a constraint matrix for a MIP solver to find an optimum core pattern solution; f) repeating steps b) through e) updating the constraints and objective functions to satisfy specified engineering requirements and establish an optimum core loading pattern. An algorithm for deriving the system of equations is also disclosed.

11 Claims, 2 Drawing Sheets

METHOD AND ALGORITHM FOR SEARCHING AND OPTIMIZING NUCLEAR REACTOR CORE LOADING PATTERNS

BACKGROUND OF THE INVENTION

1. Field of the Invention

The present invention relates generally to fuel assemblies for a nuclear reactor and, more particularly, to a method of searching for and optimizing fuel placement and burnable absorber numbers and placement in a nuclear reactor core. The invention also relates to an algorithm for optimizing core loading patterns.

2. Background Information

The core of a modern commercial nuclear power reactor is formed by numerous elongated, rectangular fuel assemblies arranged in a cylindrical vessel. The fuel assemblies are arranged in accordance with a loading pattern intended to meet certain engineering requirements, such as the distribution of power, including limits on power peaks within the core. Other considerations include the maximization of the fuel cycle length, or the time required between refuelings. The loading configuration and plan of replacement and arrangement of fuel during the life of the reactor is known as in-core fuel management, and is a major reactor design consideration.

It is common to combine fuel assemblies from previous fuel cycles with new fuel. Accordingly, a typical inventory of fuel assemblies might comprise one-third new, or feed fuel assemblies, about one-third once burned fuel assemblies and about one-third twice burned fuel assemblies. While fuel assemblies within these broad categories will have similar gross characteristics, there are differences that must be taken into account even among fuel assemblies with a common history. Further complicating in-core fuel management, is the fact that the feed fuel assemblies typically include the addition of a number of different arrangements of burnable absorbers in order to moderate their reactivity.

Traditionally, one of two techniques has been employed to establish a suitable fuel assembly loading pattern for a reactor core. In one technique, a sequence of random shuffles of fuel assemblies is used to find a loading pattern that meets specified engineering requirements. In the other technique, expert rules, developed through years of experience, are used to establish a suitable loading pattern. However, neither of these techniques assures the establishment of an optimal loading pattern.

More recently, a variety of analytical techniques, including algorithms for use individually or in combination with computer programs or solvers, have been developed and employed in order to search for and optimize core loading patterns based upon principles of optimization.

One such analytical approach was suggested in a paper entitled "*Mixed Integer Programming for Pressurized Water Reactor Fuel-Loading-Pattern Optimization*", by Taek Kyum Kim and Chang Hyo Kim, published in Nuclear Science and Engineering: 127, 346-357 (1997). This technique begins by assuming an arbitrary initial reference loading pattern of the individual fuel assemblies. The number of possible loading patterns that could be generated by shuffling all of these individual fuel assemblies is formidable. Therefore, it is not practical to individually evaluate each possible loading pattern discretely. In order to reduce the processing required, the problem is expressed as a continuous function that can then be differentiated to obtain an optimum solution. This is accomplished by linearizing the relationship between the physical distribution of the fuel assemblies and the pertinent engineering requirements using a generalized perturbation technique. Mixed integer linear programming incorporating branching and bounding is then implemented to determine the optimum loading pattern. As the linearization to individual fuel assemblies can introduce significant error, there is no assurance that the "optimal" loading pattern identified is in fact optimal. Accordingly, the process is repeated using the solution generated by the previous integration. However, there is no guarantee that subsequent solutions will converge or even that a better loading pattern will be found. The process is also heavily dependent on the initial reference loading pattern used.

Another method of establishing a fuel assembly loading pattern is described in the paper entitled "*Integer Permutation Programming in a Loading Pattern Optimization Code SUPERLPOS Used at SNERDI*" presented by Shengyi Si, at the PHYSOR 2002 Conference at Seoul, Korea on Oct. 7-10, 2002. This technique involves a two part process. First, the fuel assemblies for a load are grouped into batches based upon initial enrichment and depletion history. For instance, all of the feed fuel assemblies are considered one batch, the once burned fuel assemblies form a second batch, and the twice burned fuel assemblies make up the third batch. Initially, all of the fuel assemblies in each batch are considered to be identical. An enumeration program sequentially generates batch loading patterns one by one by shuffling the batches of fuel assemblies. For each enumerated batch loading pattern the reactivities of the individual fuel assemblies are utilized in the linearization of the effect of fuel assembly position on the specified engineering requirements. Again, mixed integer linear programming incorporating branching and bounding is applied to identify an optimal loading pattern of individual fuel assemblies for the selected batch pattern. The second part of the technique is similar to the aforementioned technique, except that the linearization using the same generalized perturbation technique has smaller errors due to the smaller perturbations required when shuffling individual assemblies inside a batch. In accordance with this technique, different batch loading patterns are serially enumerated and processed to find the optimal daughter loading pattern for each batch loading pattern. A final loading pattern is then manually selected from all of the optimal daughter loading patterns that a user cares to generate.

While this latter technique is an improvement, it still has limitations. First, it does not identify the size of the problem, in that batch loading patterns are serially enumerated and processed. Additionally, by going directly from the batch groupings to the individual fuel assemblies in one step, there can be wasted time processing patterns that have a dead end, where none of the daughter loading patterns meet the specified engineering requirements. Second, jumping to the individual fuel assemblies in one step, even though the differences are not large between fuel assemblies in the same batch, nonetheless produces sizeable errors in the linearization.

A still further method of finding fuel assembly loading patterns involves performing an exhaustive and deterministic search for all patterns satisfying specified engineering requirements. This method is disclosed in U.S. patent application Ser. No. 10/374,691 entitled: "METHOD OF ESTABLISHING A NUCLEAR REACTOR CORE FUEL ASSEMBLY LOADING PATTERN." First, all of the loading patterns possible from an inventory of fuel assemblies grouped into batches of like coarse levels of reactivity, are enumerated, taking into account selected core load position constraints. The resulting parent loading patterns are then all analyzed for compliance with certain engineering requirements, such as peak power distribution. Next, the parent loading patterns that satisfy the specified engineering requirements are each processed further by refining the original batches assigned by coarse levels of reactivity into a larger number of smaller batches according to finer levels of reactivity. If any of the resulting daughter patterns meets the specified engineering requirements, an optimal daughter pattern is selected using the well-established branch and bound mixed integer linear programming method, in which a more accurate direct perturbation technique is used instead of the generalized perturbation technique. The parent patterns are then replaced by the optimal daughter patterns and the process is repeated in order to generate patterns from even finer batches of fuel assemblies. This scheme of batch refinement and branch and bound mixed integer linear programming is repeated until the batches comprise individual fuel assemblies. Additionally, before the batch sizes are reduced to single fuel assemblies, arrangements of boron absorbers are assigned to the feed fuel assemblies. Typically there will be multiple optimal fuel loading patterns, satisfying the requisite engineering requirements, at the individual fuel assembly level. Therefore, selection of the pattern to be used can be based on criteria established by the customer, such as the optimal pattern that produces the longest fuel cycle. This final step can be performed manually or implemented automatically.

The foregoing method, although constituting a refinement in the art of core loading pattern searching and optimization, still suffers from a unique set of disadvantages. For example, it requires repeated generation of constraint matrices which are produced by perturbing the reactivity of individual assembly locations one at a time, and then calculating the effects of these perturbations for the cycle. It also requires the repeated running of a commercially available solver, such as a mixed integer program (MIP) solver. Despite significant advances in computer technology, generation of such matrices can take a prohibitively long time to perform, in some cases up to 24 hours or more. Then additional time, again potentially lasting hours in duration, is spent running the MIP solver to find the optimum.

There is also no standard or uniform run time for these calculations, making them unpredictable. The method further requires the enumeration and processing of the batch loading patterns and, in order to control linearization errors, the optimization decisions must be decomposed into three stages. This decomposition separates the fine batch assignment optimization from the burnable absorber (BA) assignment optimization, from the final assembly assignment optimization. This process can prevent the method from finding the best optimum. Furthermore, linearizing away the "shuffling non-linearity" in the nuclear flux solutions is likely to result in larger errors than if it were not linearized away. The "shuffling non-linearity" is the non-linearity caused by the fact that a shuffle changes both the neutron flux at a core location as well as the fuel composition at that location. Changing the BA assignment in a location results in a similar non-linearity for the same reason.

As it is the neutron distribution that determines the various interaction rates and energy production rate within the core, it is desireable to provide a method of core loading pattern searching and optimization that represents the shuffling non-linearity as accurately and efficiently as possible, for example by representing it directly in the constraint matrix supplied to the solver (e.g., MIP solver). This would minimize the accumulation of errors in the optimization, while simultaneously streamlining the efficiency and, in particular, the timeliness of the method optimization.

There is room, therefore, for an improved method for establishing loading patterns for nuclear reactor cores and in algorithms for facilitating searching for and optimizing core loading patterns.

SUMMARY OF THE INVENTION

These needs and others are satisfied by the present invention, which is directed to a method of finding fuel loading patterns for a nuclear reactor core. The method uses an algorithm which incorporates the equations of a nuclear design quality flux solution (e.g., the Analytic Coarse Mesh Finite Difference Method (ACMFD)) directly into a form suitable for solution by a commercially available Mixed Integer Program (MIP) solver. The formulation is non-linear and makes use of the non-linear solution techniques of the MIP solver while controlling the degree of non-linearity, in order to be low enough to still be accurate but to also be solvable within a practical time.

As one aspect of the invention, a method is presented for establishing a nuclear reactor core loading pattern for loading fuel assemblies and burnable absorbers into a nuclear reactor. The method generally comprises the steps of: a) providing nuclear data representing fuel assemblies and burnable absorbers in a nuclear reactor core; b) depleting the nuclear data to form a reference core depletion; c) incorporating the nuclear data into a system of equations of a nuclear design quality neutron flux solution; d) defining the system of equations to include constraints which accurately represent the neutron physics of the nuclear reactor, including effects of shuffling the fuel assemblies and of loading burnable absorbers into the reactor; e) employing the system of linear equations as a constraint matrix for a solver and running the solver in order to find an optimum core pattern solution; f) repeating steps b through e, updating the constraints and objective functions which can be represented as linear constraints within the constraint matrix, in order to satisfy specified engineering requirements and establish an optimum core loading pattern. The method may further include loading the core of the nuclear reactor in accordance with the optimum loading pattern.

The nuclear design quality neutron flux solution from which the system of equations is derived may be the Analytic Course Mesh Finite Difference (ACMFD) method and the solver used to perform the optimization calculations may be a mixed integer program (MIP) solver wherein the system of equations derived from the ACMFD method are incorporated directly into the constraint matrix for the MIP solver.

A representative algorithm for deriving the system of equations which are directly incorporated into the constraint matrix supplied to the solver (e.g., without limitation, MIP solver), is also disclosed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, "nuclear data" refers to data and nuclear information and parameters representing the fuel assemblies and burnable absorbers in a nuclear core and expressly includes, but is not limited to, neutron flux, power, burnup, core reactivity, core critical boron concentration, assembly location, burnable absorbers (BA) assignment and combinations thereof.

As employed herein, the phrase "specified engineering requirements" refers to one or more predetermined, desired or required nuclear core attributes having an effect on the manner in which fuel assemblies and burnable absorbers may be satisfactorily arranged therein. Such engineering requirements may include, for example, without limitation, fuel cycle cost, maximum fuel cycle length, power constraints on peak power in the core and burnup constraints on peak burnup of one or more fuel assemblies.

The term "Solver," as employed herein, refers to any known or suitable algorithm, computer program or combination thereof, which can be employed to arrive at an optimum loading pattern solution when given a set of constraint parameters relating to specified engineering requirements. The exemplary solver is an optimization solver, such as a commercially available mixed integer program (MIP) solver. A specific example of a MIP solver is sold commercially under the name CPLEX by Ilog, Incorporated which has headquarters in Mountain View, Calif.

In general, a search method for generating a loading pattern (LP) for a nuclear reactor core contains three basic steps: (1) generating patterns by shuffling assemblies, (2) performing the spatial flux and power distribution calculation, and (3) evaluating an objective function and ranking patterns for acceptance or rejection. Most known LP search methods focus on the methods for spatial analysis and objective function evaluation, without providing a theory or methodology for shuffling itself. In the absence of a systematic method for generating and pre-assessing LPs, shuffling can only be sampled heuristically and stochastically. By the time a shuffle is evaluated by a LP search code to be detrimental, it is too late, as computing time has already been wasted in the spatial analysis of the LP resulting from the shuffle. Furthermore, LP search methods based on heuristic and stochastic shuffling do not provide a sense of how good a search solution really is nor to what extent the problem has been solved. Solutions from stochastic LP search methods are not reproducible and cannot be objectively benchmarked.

Core designers know that of primary concern in a LP search, is where the feed assemblies go and where highly burnt assemblies go. This kind of "batch" loading pattern (BLP) grossly determines the major characteristics of an LP. In practical designs, engineers work with these coarse BLPs towards refinement. The difficulty is that a designer does not know how many of these BLPs there are and it is a tedious job to track down and refine a BLP manually. There are too many possible BLPs and each can sprout into an extremely large number of refinement paths. Consequently, a designer can only manually investigate a very limited number of BLPs and the derived LPs.

Figure 1:
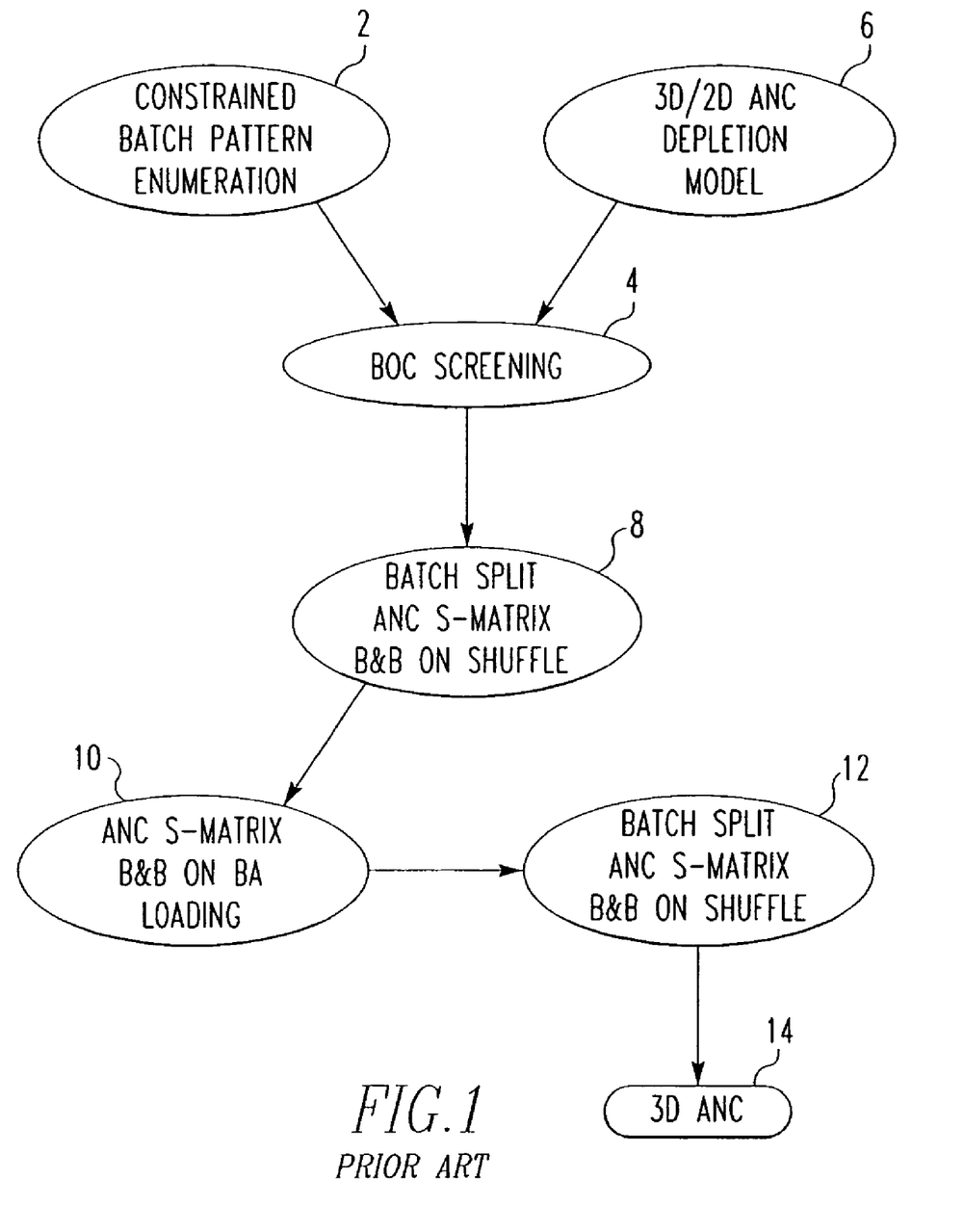
FIG. 1 is a flow diagram of the broad steps of a known method for establishing loading patterns for the fuel assemblies of a nuclear reactor core.

FIG. 1 illustrates the steps of the aforementioned known deterministic method which was summarized previously in the Background of the Invention section, herein. It was developed in an attempt to provide a more systematic approach to LP searching and overcome the foregoing problems. The method is based on two techniques, the technique of recursive pattern enumeration under position constraints and branching and bounding (B&B) mixed integer linear programming. In other words, it was a deterministic rather than stochastic search method referred to as Branching and Bounding Batch Patterns Enumerated Under Constraints (B3PEC). As shown, in a first step 2, a batch pattern enumeration with constraints is performed to enumerate all of the possible initial batch patterns. A "batch" is a grouping of substantially identical fuel assemblies. Beginning of cycle (BOC) screening is then performed on the numerated batch patterns in step 4, using a two-dimensional depletion model which is generated using Westinghouse core design code ANC to select enumerated batch patterns that meet specified engineering requirements. ANC is a multi-dimensional nodal code designed by Westinghouse for nuclear core design calculations. At step 8, each of the selected enumerated batch patterns is split into batches of finer reactivity and ANC two-dimensional depletion is performed to generate a sensitivity matrix (S-matrix). The S-matrix is then run in a mixed integer linear programming (MILP) algorithm to perform branching and bounding (B&B) on a shuffle of the split batches of fuel assemblies, to identify an optional daughter LP. If there is no daughter LP that meets the criteria, that branch is discarded. For branches having an optional daughter LP, it is used with a selected burnable absorber (BA) LP at step 10 to again generate an S-matrix to which B&B is performed with the MILP algorithm in order to determine an optimal daughter LP taking into account the BAs. A final batch split to the individual fuel assembly level is then performed and spatial analysis is used to generate yet another S-matrix, and BB& is applied to the shuffle of the fuel assemblies, all at step 12, in order to produce real LPs. Finally, a three-dimensional spatial analysis is performed to select a final LP in step 14.

This method represents an advancement in the art of LP searching in that it provides a more systematic, deterministic approach compared to known stochastic methods. It enables a user to define the search domain and to what degree the problem is solved, and thus provides the user with a good idea of how the search is progressing. However, there is vast room for improvement. For example, the method requires the enumeration and processing of the BLPs and, in order to control linearization errors, it requires the optimization decisions to be decomposed into three stages, separating the fine batch assignment optimization from the BA assignment optimization, from the final assembly assignment optimization. This can prevent the method from finding a truly optimum LP. Furthermore, linearizing away the "shuffling non-linearality" in the nuclear flux solutions is likely to result in larger errors than if it were not linearized away. Finally, the method requires repeated generation of numerous constraint matrices by perturbing the reactivity of individual fuel assembly locations one at a time and then calculating the effects of these perturbations for the cycle—a very time consuming (e.g., up to 24 hours or more) process. Then, even more time, often several additional hours, is spent running the MILP solver to find the optimum. There is no standard or uniform run time for these calculations.

The method of the present invention overcomes these disadvantages by employing an algorithm which derives the equations of a nuclear design quality flux solution into a form suitable to be directly incorporated into the constraint mainly to be run and solved by a commercial mixed integer program (MIP) solver. The formulation is non-linear and makes use of the non-linear solution techniques of the MIP solver while controlling the degree of non-linearity in order to be low enough to be solvable within a practical time, but extremely accurate.

Figure 2:
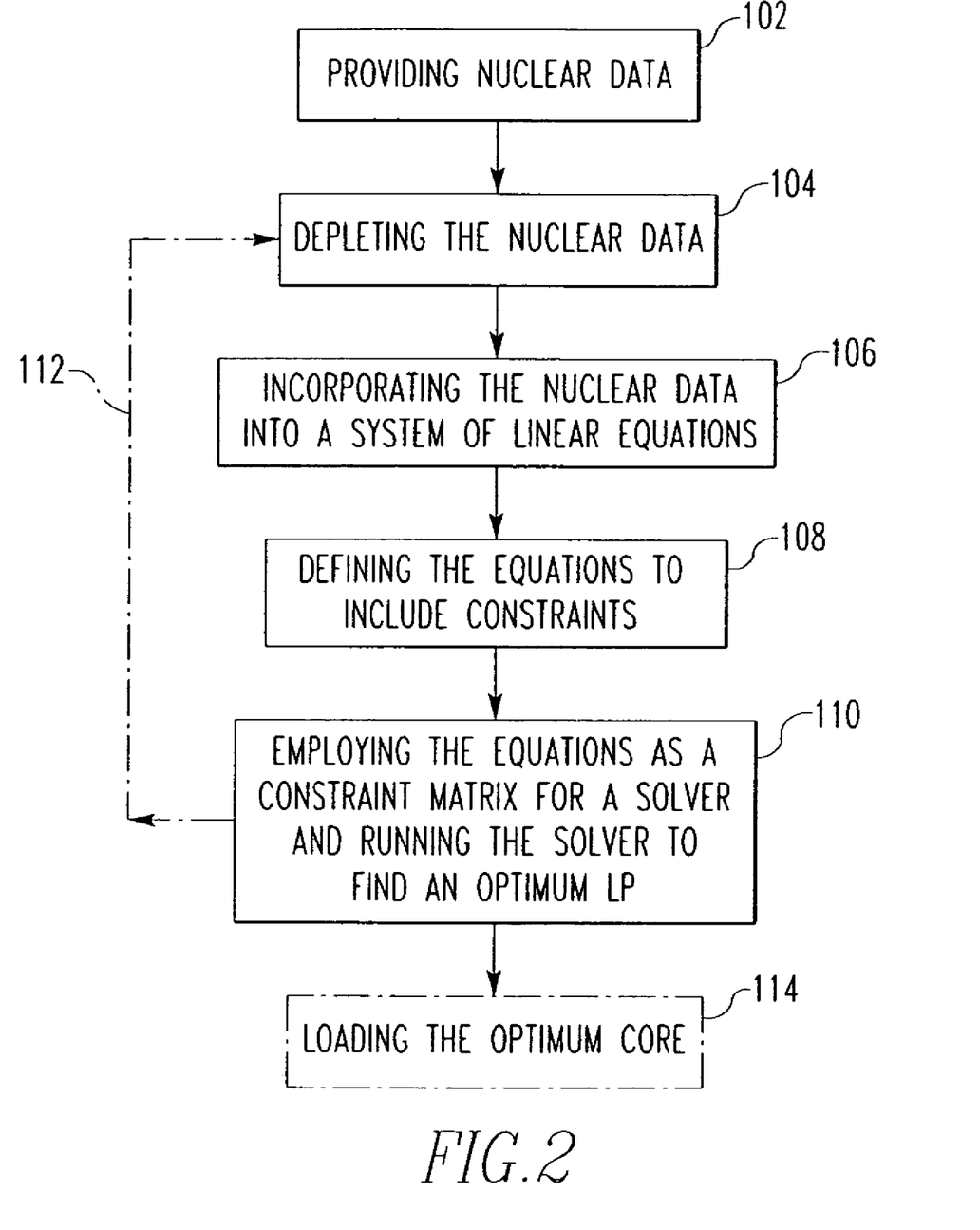
FIG. 2 is a flow diagram of the steps of the improved method of searching for and optimizing fuel placement and burnable absorber numbers and placement in a nuclear reactor core, in accordance with the invention.

Referring to FIG. 2, the steps of the exemplary method of loading pattern searching and optimization will now be discussed. As a prologue, the method involves initially reading in a three-dimensional flux solution to a first guess core loading pattern and then collapsing the three-dimensional flux solution to two dimensions. Then, a system of equations is derived using the algorithm described hereinbelow, in order to form the constraint matrix for input to the MIP solver, which is run to find the optimum loading pattern. More specifically, as shown in FIG. 2, the broad steps of the method of the present invention include: a step 102 of providing nuclear data representing the fuel assemblies and BAs of a nuclear reactor core; step 104, depleting the nuclear data in order to form a reference core depletion; step 106, incorporating the nuclear data into a system of linear equations of a nuclear design quality neutron flux solution; step 108 defining the system of linear equations to include constraints which accurately represent the neutron physics of the nuclear reactor, including effects of shuffling the fuel assemblies and of loading BAs in the reactor; step 110, employing the system of linear equations as the constraint matrix for a solver and running the solver to find an optimum core pattern solution; step 112, repeating steps 104 through 110 while updating the constraints or objective functions within the constraint matrix, in order to satisfy specified engineering requirements; and step 114 loading the core of the nuclear reactor in accordance with the optimum loading pattern.

Certain of these steps will now be discussed in greater detail. First, it will be appreciated that the nuclear data provided in step 102 may include, for example, neutron flux, power, burnup, core reactivity, core critical boron concentration, assembly location, BA assignment or any other suitable parameter and combinations thereof. The depletion of this nuclear data to form a reference core, in step 104, is done using ANC's 3D to 2D collapsing capability to generate a constraint matrix. ANC is a multi-dimensional nodal code designed by Westinghouse for nuclear core design calculations and is commercially available from Westinghouse Electric Company LLC, Monroeville, Pa. It predicts, for example, core reactivity, assembly power, rod power, detector thimble flux and other relevant core characteristics. The 2D depletion is then incorporated, in step 106, into an algorithm or system of linear equations of a nuclear design quality neutron flux solution method, which in turn are defined to include constraints (e.g., effects of shuffling fuel assemblies and BAs) and directly incorporated into the constraint matrix of an optimization solver in steps 108 and 110, respectively.

The nuclear design quality flux solution method used in the exemplary algorithm, is the Analytic Coarse Mesh Finite Difference Method (ACMFD). Coarse Mesh Finite Difference Methods and their application in the context of nuclear reactor core design, are discussed in a paper entitled "*Coarse Mesh Finite Difference Methods and Applications*," by Y. A. Chao, which was published in the materials for a program sponsored by PHYSOR, held Monday, May 8, 2000, through Thursday, May 11, 2000. Briefly, in the ACMFD method, the unknowns in the analytic expressions for the effective diffusion coefficients (ECDs) are, the eigen-value and the ratio of the transverse leakage to the node average flux. All other constraints are expressible in terms of the node group restraints. Therefore, ACMFD does not need a higher level nodal code spatial solution in order to determine the ECDs. The ECDs can be upgraded analytically on a node-by-node basis using the most recent solution of the ACMFD itself. The accuracy of ACMFD has been found to be very good and its simplicity is very attractive for applications such as core loading pattern searches, where a variety of calculations at different levels of accuracy are needed at different stages of the search process. It is also easily adaptable to a variety of approximations, including linearization approximations.

In the present invention, the system of equations derived through the ACMFD solution are directly incorporated into the constraint matrix supplied to the solver in step 110. The exemplary solver is a mixed integer program (MIP) solver such as CPLEX commercially sold by Ilog, Incorporated of Mountain View, Calif. CPLEX is a very effective optimization code which uses a SIMPLEX-type linear programming method for real variable solution search and the B&B method for integer variable search. CPLEX includes options for integer and continuous variables allowing for representation of the constraints and objective functions to meet specified engineering requirements such as peak power constraints, burnup constraints on peak burnup, and objectives such as minimizing fuel cycle cost.

In employing the ACMFD solution method, the method of the present invention utilizes an algorithm that provides a non-intuitive representation of the fuel assembly mixing representation in order to reduce the order of the non-linearity. Specifically, the algorithm uses a reference flux solution to calculate the coefficients in the constraint matrix that model the changes in material properties at various locations in the core as an effect of core shuffles, including the effects of core shuffles on depletion.

The EXAMPLE herein below outlines the expressions of the exemplary algorithm used in accordance with the method of the present invention to supply the constraint matrix to the MIP solver for optimization. The EXAMPLE is provided to give further clarity and understanding of the present invention and is not limiting upon the scope of the invention. Before defining the expressions of the exemplary algorithm, a brief summary of how the algorithm was derived will be provided as background.

The algorithm of the present invention was derived by using the reference pattern flux for the depletion, but with cross-sections from the perturbed pattern. The reference fluxes are constants in the equations and, therefore, do not lead to higher order terms. This permits representing the shuffling non-linearity exactly as a set of linear equations, but at the expense of some additional variables and constraint equations. This allows for a sufficient approximation for accurately representing the reactor core fluxes and power distribution. For calculation of the objective function and constraint equations, as they depend on the core material properties, the depletion is done based upon the reference power distribution which can use the calculated flux to deplete without ending up with terms to model that are of higher order than desired. In other words, the starting equations are strongly non-linear. Then, three techniques are applied that reduce the order of the equations to become linear. The first of these is a matter of bookkeeping, to write the equations such that when assembly shuffles are represented by continuous variables, the cross term of the flux and the assembly cross sections are calculated and recorded separately for each partial assembly that makes up the total assembly. This is not an approximation because in the final solution we do not have partial assemblies in any locations. Second, many of the coefficients in the equations, generally those associated with depletion, are calculated using the fast flux from a reference case. This is the only one of the three techniques which is an approximation. However, it is a very good approximation due, in part, to the fact that the fast flux is relatively constant from case to case during the LP search for a particular cycle. Third, the non-linear term that is remaining, which represents the shuffling non-linearity, is a product of a binary variable and a continuous variable. This non-linear term may be represented exactly by the set of linear equations described herein, which are added to the constraint matrix. Thus, by these manipulations, these highly non-linear equations are reduced to a set of linear equations with very little approximation.

The following is a representative example of the method and algorithm of the present invention:

EXAMPLE

The expressions of the exemplary algorithm follow. For the flux solution, the neutron balance equation for each node is:

$$\sum_{j \in adjacent} J_{ij}^1 + \phi_i^1 \sum_R^1 (k_{\infty i} - 1) = 0 \forall_i \quad \text{(Expression 1)}$$

where the k-infinity for the $i^{th}$ node is:

$$k_{xi} = \left[ \frac{v^1 \sum_f^1}{\sum_R^1} + \frac{v^2 \sum_f^2}{\sum_R^1} \frac{\sum_s^{12}}{\sum_a^2 + D^1 B^{22}} \bigg| ref \right]_i - 1 \quad \text{(Expression 2)}$$

and the currents between the $i^{th}$ node and the j neighbors of i are:

$$J_{ij} = - \sum_{j \in adjacent} (D_i^S \overline{\phi}_i - D_j^A \overline{\phi}_j) \quad \text{(Expression 3)}$$

where:
S stands for "self" and $D^S$ depends on the characteristics of the $i^{th}$ node,
A stands for "adjacent" and $D^A$ depends on the characteristics of the adjacent nodes,
$\upsilon^m$ is the neutrons per fission in the $n^{th}$ group,
$\Sigma_f^m$ is the macroscopic fission cross section for the $n^{th}$ group,
$\Sigma_R^1$ is the macroscopic removal cross section for the fast group,
$\Sigma_a^2$ is the macroscopic absorption cross section for the thermal group,
$D^2$ is the diffusion coefficient for the thermal group,
$B^2$ is the buckling for the thermal group,
i and j are radial indices over nodes in the nuclear model,
J represents the neutron current, and
$\phi$ represents the neutron flux.

When one includes the effects of shuffles, expression 1 has terms like the following:

$$D_i^d \phi_i^n \approx \phi_i^n \left[ \sum_a X_{la} D_a^{od} + \sum_{b=1}^n \overline{P}_l^b step^b \sum_a X_{la} \frac{dD^d}{dbu} \bigg|_a^b \right] \quad \text{(Expression 4)}$$

where:
b=the burn-up step,
n=the current step,
$P_1$=the power in the $1^{th}$ node,
the subscript "1" is the index over location,
the subscript "a" is the index over assembly,
$X_{la}$ is the [0,1] variable that is 1 only if assembly a is assigned to location 1,
the "0" superscript refers to quantities that are from the reference distribution, and
"step" refers to the length of the burnup step in the depletion.

Expression 4 was derived by writing an expression for the very first variable in terms of the shuffle operation (performed by the binary variable) and including the effects of depletion on whatever fuel is loaded into this location.

When one includes the effects of shuffles, expression 1 also has a term like the following:

$$\phi_i^n \sum_l^n = \phi_i^n \left[ \sum_a X_{la} \sum_a^o + \sum_{b=1}^n \overline{P}_l^b step^b \sum_a X_{la} \frac{d\Sigma}{dbu} \bigg|_a^b \right] \quad \text{(Expression 5)}$$

where the only new notation is the following:

$$\Sigma = \Sigma_R^1 (K_\infty - 1) \quad \text{(Expression 6)}$$

both of these (expressions 4 and 5) have a term like the following:

$$\sum_{b=1}^n \overline{P}_l^b step^b \sum_a X_{la} \frac{d\Sigma}{dbu} \bigg|_a^b \equiv term \quad \text{(Expression 7)}$$

where:
the $\Sigma$ may represent the definition in expression 6, or it may represent $D^d$ The average power during the $b^{th}$ depletion step is:

$$\overline{P}_l^b = \frac{P^{b-1} + P^b}{2} \quad \text{(Expression 8)}$$

where:
b is the depletion step in mega watt days per metric ton uranium (MWD/MTU) for the core, and
$d\Sigma/db$ for the b step for the a assembly is the change in $\Sigma$ during the depletion step.

However, this is evaluated at the middle of the depletion step for each assembly a, for the burnup that the a assembly would have if it was in the $1^{th}$ location in the flux of the reference loading pattern (LP) (e.g., given the reference LP fast flux and thermal leakage, the power that this assembly would have in the reference LP, in this location, is calculated and then used to deplete to this time in core life, in order to calculate how core parameters are changing at this particular time in core life).

Next, an approximation for P in terms of only reference quantities is needed in order to avoid modeling third order terms like $\phi \times P \times X_{la}$. As fast flux changes less from LP to LP than does power, the following equation uses the reference pattern fast flux for depletion:

$$\overline{P}_t^b = \overline{\phi}_l^{b,ref} \sum_a X_{la} \left( K^1 \sum_f \frac{1}{s} + \frac{\sum_s^{12} K^2 \sum_f^2}{\frac{1}{R} + D_2 B_2^2} \bigg|_{ref} \right)\bigg|_a \quad \text{(Expression 9)}$$

where:
K represents the energy per fission for the fast group with a superscript 1 and for the thermal group with a superscript 2, which makes:

$$\text{term} = \sum_{b=1}^{n} \overline{\phi}_l^{b,ref} \sum_a X_{la} K \sum_f \bigg|_a^b \sum_{a'} X_{la'} \frac{d\sum}{dbu}\bigg|_{a'}^b \quad \text{(Expression 10)}$$

This looks like it would require additional variables and/or constraints in order to handle the cross term $X_{la} X_{la'}$. Physically, this product represents assembly blending in the continuous solution when assemblies are combined. When assembly a is blended with assembly a', part of the burn-up seen by the partial assembly a' is caused by the flux generated by assembly a, and vice versa. Instead, rather than blending the assemblies, they are combined in a segmented fashion such that each one sees only the flux history/burn-up that it would see if it alone were in place. In other words, by way of analogy, this is analogous to building the assemblies out of bricks rather than out of poured concrete. This is the previously discussed non-intuitive representation of the assembly mixing representation which is a key aspect of the invention. It makes it possible to reduce the order of the non-linearity and directly treat it rather than linearizing it away. The equation for this becomes:

$$\text{term} \rightarrow \sum_{b=1}^{n} \overline{\phi}_l^{b,ref} \sum_a X_{la} \left( K \sum_f \bigg|_a^b \right)\left( \frac{d\sum}{dbu} \bigg|_a^b \right) \quad \text{(Expression 11)}$$

For $X_{la}=1$, the equations are identical (e.g., the end result has not changed, only the path by which it is achieved). This makes the neutron current terms:

$$D_\ell^d \phi_\ell^n \approx \phi_\ell^n \left[ \frac{\sum_a X_{fa} D_a^{od} + \sum_{b=1}^n \overline{\phi}_\ell^{b,ref} step^b}{\sum_a X_{fa}\left( K \sum_f \bigg|_a^b \right)\left( \frac{d\sum}{dbu}\bigg|_a^b \right)} \right] \quad \text{(Expression 12)}$$

This makes the multiplication and absorption term:

$$\sum \phi_\ell^n = \phi_\ell^n \left[ \frac{\sum_a X_{fa} \sum_a^o + \sum_{b=1}^n \overline{\phi}_\ell^b step^b}{\sum_a X_{fa}\left( K \sum_f \bigg|_a^b \right)\left( \frac{d\sum}{dbu}\bigg|_a^b \right)} \right] \quad \text{(Expression 13)}$$

The non-linear terms in the above equation are:

$$\phi_l^n X_{la} \quad \text{(Expression 14)}$$

This represents the fundamental non-linearity in LP search, the fact that the flux in location 1 multiplies the cross-sections in location 1, both of which change. Linearization of this product is achieved through use of linearization tools or tricks, such as the "big M" method, where logical conditions are imposed and extra constraints are derived by including M, which is an upper bound for X and thus, also $\Psi_{la}$, a continuous variable used to replace the binary variable. See, e.g., H. Paul Williams, Model Building in Mathmatical Programming, 4$^{th}$ ed., p. 164 (1999).

Therefore:

$$\Psi_{la} = X_{la} \quad \text{(Expression 15)}$$

$$\Psi_{la} - MX_a \leq 0 \quad \text{(Expression 16)}$$

$$-\phi_l + \Psi_{la} \leq 0 \quad \text{(Expression 17)}$$

$$\phi_l - \Psi_{la} + MX_{la} \leq M \quad \text{(Expression 18)}$$

where expressions 15-18 represent 3×l×a new constraint equations to be added to the constraint matrix.

The foregoing EXAMPLE confirms the ability of the exemplary method and algorithm therefor to program flux solution equations directly into the constraint matrix of the optimization problem. This improves efficiency and timeliness of the optimization while maintaining accuracy because the constraints accurately depict the neutron physics of the core fuel assemblies and BAs. For example, the system of equations supplied to the constraints matrix represents the shuffling non-linearity, without approximation, as a set of linear equations and auxiliary variables and it represents the depletion of the reactor core. The linear equations are also derived in part by using a continuous relaxation of the term in the equations of assembly nuclear parameters times assembly flux that segregates the partial assembly parameters by assembly, eliminating the cross term and consequently reducing the order of the original equations by one. Additionally, as shown for example, in expressions 9 and 10, the linear equations are derived in part by calculating certain coefficients by taking results by depleting candidate shuffled assemblies and candidate BAs, using the reference pattern depletion fast flux as an approximation to the shuffled pattern fast flux. The equations are then entered directly into the constraint matrix supplied to the aforementioned MIP solver in order to achieve a rapid (in comparison with known prior art optimization methods) and accurate optimized solutions.

In summary, the method of the present invention reads in a 3D flux solution to a first guess loading pattern, collapses the 3D solution to 2D, uses the equations of the algorithm as the constraint matrix for input to the MIP solver in order to find the continuous optimum, depletes the continuous optimum as the new reference, and finds the integer optimum using the algorithm to form the constraint matrix for input into the MIP solver. The result is an accurate output in the form of an optimized loading pattern for fuel assemblies and BAs which may be used to load the core.

It will be appreciated that optional steps may be incorporated into the exemplary LP search method. For example, a pattern of feed fuel assemblies to be analyzed may optionally be generated and supplied to the code (e.g., ANC). From experience, it is known in the art that feed fuel assemblies should be arranged in a generally even manner in order to minimize neutron leakage and to get an even power distribution. Pre-generating a pattern of feed assemblies in accordance with these principles, gives the core modeling code (e.g., ANC) a jump-start, thus requiring even less run time to find the solution.

The method of the present invention employs a periodic regeneration of a reference model based on continuous variable optimized loading patterns in order to minimize the accumulation of errors in the optimization. Finally, the method and algorithm therefor directly represent the loading pattern search shuffling non-linearity such that interchanges between fuel assemblies are no longer limited to be small in reactivity difference, due to the linearization of this effect. By programming the flux solution equations directly into the constraint matrix supplied to the MIP solver, the number of design code flux solutions required is minimized, thereby simplifying the optimization problem while maintaining a high degree of accuracy.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of establishing a nuclear reactor core loading pattern for loading fuel assemblies and burnable absorbers into a nuclear reactor in accordance with a set of predetermined engineering requirements, said method comprising the steps of:
    a. providing nuclear data representing fuel assemblies and burnable absorbers in a nuclear reactor core;
    b. depleting said nuclear data to form a reference core depletion;
    c. incorporating said nuclear data into a system of equations of a nuclear design quality neutron flux solution which include constraints representing the neutron physics of said nuclear reactor, including nonlinear effects of shuffling said fuel assemblies and of loading said burnable absorbers into said reactor;
    d. employing said system of equations as a constraint matrix for a solver and running said solver, without first requiring multiple reactor core simulations to be run to map a response domain; and
    e. repeating steps b through d, updating the constraints and including objective functions which can be represented as linear constraints within said constraint matrix, in order to satisfy said specified engineering requirements and establish a global, nonlinear optimum core loading pattern.

2. The method of claim 1 including loading the core of said nuclear reactor in accordance with said optimum loading pattern.

3. The method of claim 1 wherein said nuclear design quality neutron flux solution from which said system of equations is derived is the Analytic Course Mesh Finite Difference (ACMFD) method; wherein said solver is a mixed integer program (MIP) solver; and wherein the system of equations derived from said ACMFD method are incorporated directly into said constraint matrix for said MIP solver.

4. The method of claim 1 wherein said effects of shuffling said fuel assemblies in step c include shuffling non-linearity; and wherein said shuffling non-linearity is represented in said system of equations.

5. The method of claim 4 wherein said fuel assemblies have a flux and nuclear parameters; wherein said system of equations has a term comprising the nuclear parameters of said fuel assemblies times the flux of said fuel assemblies; wherein said flux of said fuel assemblies is represented as a cross term comprising the product of assigned locations of said fuel assemblies in said core; wherein step c further includes deriving said system of equations using a continuous relaxation of the term in the equations of the nuclear parameters times assembly flux; and wherein said continuous relaxation segregates partial fluxes and partial assembly parameters by eliminating the cross term, thereby reducing the order of the equations in said system of equations.

6. The method of claim 5 wherein said fuel assemblies which have been shuffled have a shuffled pattern fast flux; wherein said reference core depletion has a fast flux; wherein said method further comprises calculating a plurality of coefficients for said system of equations by selecting and depleting a number of said fuel assemblies which have been shuffled and a number of said burnable absorbers; and wherein said fuel assemblies and said burnable absorbers are selected and depleted using said reference core depletion fast flux as an approximation to the shuffled pattern fast flux.

7. The method of claim 1 wherein step c includes representing the depletion of said reactor core in said system of equations.

8. The method of claim 1 further including the step of generating a feed pattern to be analyzed after step b of depleting said nuclear data to form a reference core depletion.

9. The method of claim 1 wherein said specified engineering requirements of step e are selected from the group consisting of fuel cycle cost, power constraints on peak power in said core, burnup constraints on peak burnup of one or more fuel assemblies, and custom user supplied engineering requirements; and
    wherein step e includes the steps of:
    selecting at least one of said specified engineering requirements,
    representing at least one of said objective functions and said constraint as a linear combination of a plurality of nuclear parameters selected from the group consisting of neutron flux, power, burnup, core reactivity, core critical boron concentration, assembly location and BA assignment,
    supplying said linear representation to the constraint matrix of said solver,
    running said solver to find an optimum satisfying said specified engineering requirements, and
    repeating the steps of updating the constraints and including objective functions until an optimum core loading pattern which meets all of said specified engineering requirements is achieved.

10. The method of claim 1 wherein said reference core depletion has a reference fast flux; and wherein said equations incorporated into said constraint matrix are determined by the approach embodied in the following expressions (1) through (18):

$$\sum_{j \in adjacent} J'_{ij} + \phi_i^1 \sum_R (k_{\infty i} - 1) = 0 \forall_i \quad (1)$$

where $k^\infty$ for the $i^{th}$ node is:

$$k_{\infty i} = \left[ \frac{\nu^1 \sum_f^1}{\sum_R^1} + \frac{\nu^2 \sum_f^2}{\sum_R^1} \frac{\sum_s^{12}}{\sum_a^2 + D^1 B^{22}} \bigg| ref \right]_i - 1 \quad (2)$$

and the equation for the currents between the $i^{th}$ node and the j neighbors of i are:

$$J_{ij} = -\sum_{j \in adjacent} (D_i^S \overline{\phi}_i - D_j^A \overline{\phi}_j) \quad (3)$$

where:
S stands for "self" and $D^S$ depends on the characteristics of the $i^{th}$ node,
A stands for "adjacent" and $D^A$ depends on the characteristics of the adjacent nodes,
$\nu^n$ is the neutrons per fission in the $n^{th}$ group,
$\Sigma_f^n$ is the macroscopic fission cross section for the $n^{th}$ group,
$\Sigma_R^1$ is the macroscopic removal cross section for the fast group,
$\Sigma_a^2$ is the macroscopic absorption cross section for the thermal group,
$\Sigma_s^{12}$ is the macroscopic down scatter cross section from the fast group to the thermal group,
$D^1$ is the diffusion coefficient for the fast group,
$B^2$ is the buckling for the thermal group,
ref refers to the reference calculation value,
i and j are radial indices over nodes in the nuclear model,
J represents the neutron current,
$\phi$ represents the neutron flux, and
$\forall_i$ means for every i.
When one includes the effects of shuffles, expression 1 also has the following term:

$$D_f^d \phi_\ell^n \approx \phi_\ell^n \left[ \sum_a X_{\ell a} D_a^{od} + \sum_{b=1}^n \overline{P}_\ell^b step^b \sum_a X_{\ell a} \frac{dD^d}{dbu} \bigg|_a^b \right] \quad (4)$$

where:
b=the burn-up step,
$d \in (S,A)$ such that $D^d$ represents both $D^S$ and $D^A$ as defined in expression (3),
n=the current step,
bu=burnup,
$P^1$=the power in the $1^{th}$ node,
$\phi$ represents the neutron flux,
the subscript "1" is the index over location,
the subscript "a" is the index over assembly, $X_{la}$ is the [0,1] variable that is 1 only if assembly a is assigned to location 1,
The "0" superscript refers to quantities that are from the reference distribution, and
"step" refers to the length of the burnup step in the depletion.

Expression 1 has the following term:

$$\phi_\ell^n \sum_\ell = \phi_\ell^n \left[ \sum_a X_{\ell a} \sum^o + \sum_{b=1}^n \overline{P}_\ell^b step^b \sum_a X_{\ell a} \frac{d\Sigma}{dbu} \bigg|_a^b \right] \quad (5)$$

where the only new notation is the following:

$$\Sigma = \Sigma_R^1 (k_\infty - 1) \quad (6)$$

Both of these (expressions 4 and 5) have the following term:

$$\sum_{b=1}^n \overline{P}_\ell^b step^b \sum_a X_{\ell a} \frac{d\Sigma}{dbu} \bigg|_a^b \equiv term \quad (7)$$

where:
the $\Sigma$ may represent the definition in expression (6), or it may represent $D^d$,
$step^b$ is the depletion step in mega watt days per metric ton uranium (MWD/MTU) for the core, and
$d\Sigma/dbu$ for the b step for the a assembly is the change in $\Sigma$ during the depletion step.

The average power during the $b^{th}$ depletion step is:

$$\overline{P}_\ell^b = \frac{P^{b-1} + P^b}{2} \quad (8)$$

Using the reference fast flux for depletion gives:

$$P_l^b = \overline{\phi}_l^{b,ref} \sum_a X_{la} \left( K^1 \sum_f^1 + \frac{\sum_s^{12} K^2 \sum_f^2}{\sum_R^1 + D_2 B_2^2} \bigg|_{ref} \right)^b \bigg|_a \quad (9)$$

where:
K represents the energy per fission for the fast group with a superscript 1 and
for the thermal group with a superscript 2,
$D_2$ is the thermal diffusion coefficient, and
$B_2$ is the thermal buckling,
which makes:

$$term = \sum_{b=1}^n \overline{\phi}_l^{b,ref} \sum_a X_{la} K \sum_f \bigg|_a^b \sum_{a'} X_{la'} \frac{d\Sigma}{dbu} \bigg|_{a'}^b \quad (10)$$

The equation becomes:

$$\text{term} \rightarrow \sum_{b=1}^{n} \overline{\phi}_l^{b,ref} \sum_a X_{la} \left( K \sum_f \Big|_a^b \right) \left( \frac{d\Sigma}{dbu} \Big|_a^b \right) \quad (11)$$

For $X_{la}=1$, the equations are identical. This makes the neutron current terms:

$$D_l^d \phi_l^n \approx \quad (12)$$

$$\phi_l^n \left[ \sum_a X_{la} D_a^{od} + \sum_{b=1}^{n} \overline{\phi}_l^{b,ref} \, step^b \sum_a X_{la} \left( K \sum_f \Big|_a^b \right) \left( \frac{d\Sigma}{dbu} \Big|_a^b \right) \right]$$

This makes the multiplication and absorption term:

$$\sum \phi_l^n = \phi_l^n \left[ \sum_a X_{la} \sum_a^o + \sum_{b=1}^{n} \overline{\phi}_l^b \, step^b \sum_a X_{la} \left( K \sum_f \Big|_a^b \right) \left( \frac{d\Sigma}{dbu} \Big|_a^b \right) \right] \quad (13)$$

The non-linear terms in the above equation are:

$$\phi_l^n X_{la} \quad (14)$$

The linearization of this product is:

$$\Psi_{la} = X_{la} \quad (15)$$

$$\Psi_{la} - MX_a \leq 0 \quad (16)$$

$$-\phi_l + \Psi_{la} \leq 0 \quad (17)$$

$$\phi_l - \Psi_{la} + MX_{la} \leq M \quad (18)$$

where:

M is the upper bound for X and thus, also for $\Psi_{la}$, and wherein expressions 15-18 represent new constraint equations to be added to said constraint matrix.

11. The method of claim 10 including the steps of:
  programming expressions 15-18 directly into the constraint matrix of said MIP solver, thereby minimizing the number of design code flux solutions required; and
  running said MIP solver to find an optimal LP.

* * * * *